Nov. 20, 1951  L. T. WILSON  2,575,478

METHOD AND SYSTEM FOR UTILIZING SOLAR ENERGY

Filed June 26, 1948

INVENTOR.
Leon T. Wilson
BY
Bartlett, Eyre, Keel & Weymouth
Attorneys

Patented Nov. 20, 1951

2,575,478

UNITED STATES PATENT OFFICE 2,575,478

METHOD AND SYSTEM FOR UTILIZING SOLAR ENERGY

Leon T. Wilson, Canadensis, Pa.

Application June 26, 1948, Serial No. 35,364

6 Claims. (Cl. 237—1)

This invention relates to a heating system and method for heating domestic and commercial buildings and for other purposes, and particularly a system and method for utilizing solar energy.

One object of the invention is a novel and improved method and system of the above indicated character and characterized by low operational and maintenance cost.

Another object is a novel and improved method and system of the above character.

Another object is a novel and improved system of the above indicated character and characterized by high operating efficiencies.

Another object is a new and improved heating system utilizing solar energy that is adaptable for use in most human inhabited climates.

These and other objects will become more apparent in the following description and drawings forming part of this application.

In the drawings—

Heating systems for obtaining heat from natural sources have been heretofore proposed. These systems have failed to come into general use for heating purposes either because of the failure of the device to supply the required amount of heat or because the cost of installation and maintenance exceeds that of more conventional systems, and for other reasons.

In the case of the solar heater it has been found for instance that it is uneconomic when operated with large differences in temperature between the solar heater and the outside air since the losses are so large that the net useful heat per unit area of the heater becomes so small that to supply the needed heat the size of the heater becomes prohibitive. Moreover, in colder climates such as in the temperate zone, the heating requirements can not be supplied with reasonably sized units readily adaptable for domestic or sometimes even commercial use.

Heat pumps have not been generally employed because of the lack of a suitable source of heat such as an underground stream or the like, and, secondly, the high cost of installation of the equipment. The cost of electricity for operation of the heat pump as a year round source of heat, coupled with relatively high installation and maintenance costs, does not favorably compare with other conventional systems even in view of its inherent advantages.

I have found that the disadvantages of the solar heater and the heat pump systems may be obviated or minimized and the advantages of each of them retained by correlating the essentials of the two systems or units into a single system or unit, and moreover, with the two units cooperating and functioning together to obtain improved efficiencies and reduction in the physical sizes of the equipment.

In one aspect, therefore, my invention resides in combining the essentials of the solar heater with those of the heat pump and in a manner to obtain the improvements indicated.

This correlation of a solar heater with the heat pump also enables the solar heater to supply the large heat demands required in colder climates where a solar heater of comparable size and capacity would otherwise not be operable.

I have also found that my new and improved heating system possesses a "self-regulating" characteristic whereby a temperature differential between the ambient temperature and the temperature of the solar heater reservoir is maintained so that the solar heater may operate at a high, year-round efficiency.

As compared with conventional systems using, for example coal, oil or gas as a source of heat, I have found that my new system and method results in a substantial reduction in energy costs, for instance, that the total yearly energy cost of operation of the system may be as low as one-third and should not be appreciably greater than one-half the energy costs for a relatively efficient conventional commercial oil burning system.

Figure 1:
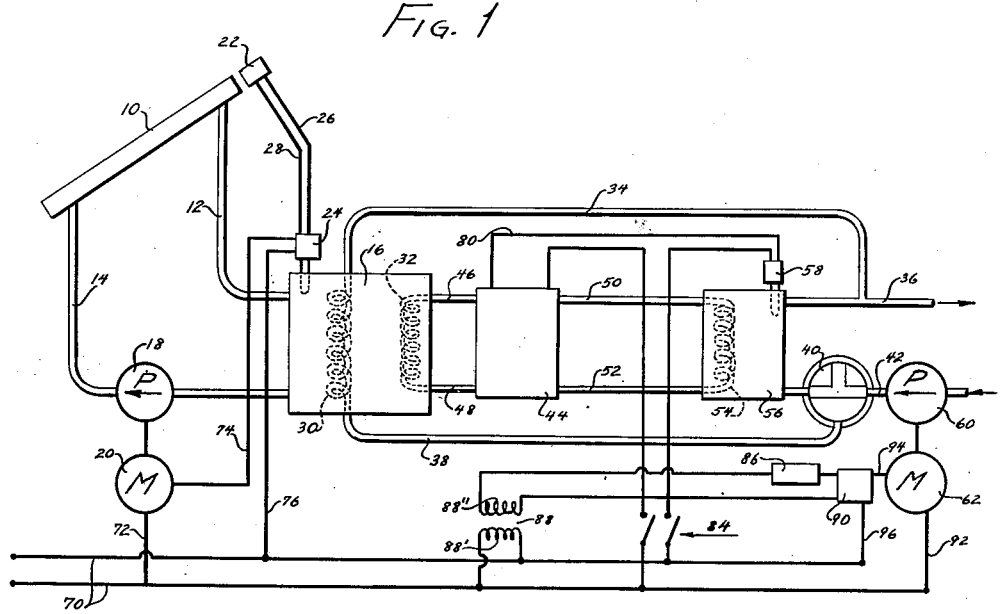
Fig. 1 is a diagrammatic layout of a system embodying the invention.

Referring to the embodiment shown in Fig. 1, which has been chosen for illustration purposes, the system includes a solar heater 10 having outlet and inlet conduits 12—14 connected with a storage tank 16. In one form, the solar heater 10 may be formed of a flat plate of copper or other heat conducting material with a plurality of interconnected conduits soldered or otherwise fastened to the surface. The entire structure may then be housed in a shallow box-like structure and covered with one or two layers of a transparent material such as window glass or the like. To increase the heat absorbing quality of the heater, the plate together with the conduits are preferably blackened.

Fluid is circulated through the heater by a circulating pump 18, driven by a motor 20, interposed in conduit 14 which pumps the fluid from the tank 16 to the heater 10 and back to the tank, thereby conducting heat from the collector or heater 10 to the storage tank. The operation of the circulating pump may be controlled by a pair of thermostats 22 and 24 on the heater 10 and tank 16, respectively. These thermostats are interconnected by wires 26—28 or other suitable means and are arranged to operate the motor 20 when the solar heater temperature is above that of the tank. In this way heat will always be conveyed from the heater to the tank.

Although not shown, it may be desirable to include an additional thermostat to limit the highest temperature of the tank 16 particularly in the late spring, summer and early fall when heating requirements are relatively small.

For best results the heater 10 should face the south and since it is to be part of a year-round heating system I have found that the optimum position for the heater is one in which it is substantially normal to the sun's rays at noon during seasonal periods in which the demand for heat is the greatest. The optimum angle, therefore, should be that at which the heater is normal to the sun's rays during the coldest season and is theoretically equal to the latitude minus the sun's declination for that period. For the New York city area I have found the optimum angle to be in the range of 55° to 60° and I have found that with the heater permanently positioned at that angle the loss in efficiency or performance experienced as the sun's zenith distance decreases is more than offset by the advantages gained, namely, lower installation costs and maximum performance when heat demands are the largest. In domestic installations the heater, if fixedly positioned at a given angle, can be made to form part of the dwelling roof and thereby effect some reduction in cost in the fabrication of new homes embodying my invention. Moreover, a still further saving will result in new homes by reason of the elimination of the conventional chimney.

For simplicity I have illustrated my invention for use with a hot water heating system wherein water or other suitable fluid is heated to a desired temperature and circulated through a radiating system in the building to be heated. It is apparent, however, that my system would be equally useful for heating air for circulation through the rooms to be heated.

In the present embodiment the tank 16 is provided with a pair of heat exchange coils 30 and 32. The coil 30 is connected at its upper end with a conduit 34 which in turn is connected with the conduit 36 forming part of the hot water circulating and radiating system previously referred to. The lower or return end is connected by a conduit 38 to the hot water return conduit 42 by way of a two-way valve 40. During those periods of the year, say from April or May to September or October, when heating requirements are light, the water in the circulating system which includes conduits 36 and 42, may be heated directly by the water or fluid in the tank 16 merely by setting the valve 40 to connect conduit 42 with conduit 38.

The coil 32 in the tank 16 constitutes the heat source for the heat pump 44 and is connected thereto by conduits 46 and 48. The output of the heat pump is connected by conduits 50 and 52 to a heat exchange coil or condenser 54 situated in a second and somewhat smaller fluid reservoir 56.

Under conditions when the demand for heat is large, as in the winter months, the heat pump is used to remove heat from the tank 16 and dissipate in the smaller tank 56 thereby raising the temperature of that tank materially above that of the tank 16. The heat pump may be driven by an electric motor or other suitable means and controlled by a thermostat 58 in the tank 56.

The heat pump 44 has not been illustrated in detail since its particular construction does not form part of the invention. For the purposes of this description, however, it may be pointed out that in one form a heat pump may be considered similar to a conventional household refrigerator employing a suitable fluid that is expanded in the coil 32 in tank 16 in much the same manner as the refrigerant of a refrigerator is expanded in the evaporating unit in the cold compartment. The expanded fluid is then compressed by a pump and the heat is dissipated in the condenser 54 in the tank 56. This condenser is the equivalent of the condenser in a refrigerator over which air is blown for cooling purposes.

It is therefore apparent that with this system it is possible to raise the temperature of the small tank 56 far above the temperature of tank 16. For instance, the temperature of tank 56 can be maintained as high as 120° F. whereas the tank 16 may be cooled to as low as 32° F. and even lower, depending on the fluid used in tank 16 and the heater 10.

This condition clearly illustrates one advantage of my system in that it is possible to maintain a large temperature differential between the tank 16 and the heater 10 so that even in cold weather and under conditions when the atmosphere absorbs a large part of the solar energy, a substantial amount of heat nevertheless can be obtained from the solar rays. For instance under conditions wherein it is necessary to supply a maximum of 15,000 B. t. u. per degree day for heating a building, it was found that over a period of about five days with outside temperatures averaging about 23° F. the temperature of tank 16 dropped from 59° to only about 38° F. These figures are based on a tank volume of the order of 1,000 cubic feet and a solar heater positioned as heretofore described having an area of about 900 sq. ft., and during this period the amount of available sunshine was about 10% of maximum. Under conditions where water is used in the solar heater and tank 16, it is possible, should the tank temperature approach freezing, to replace the water in the tank with city water which is ordinarily about 50° to 55° F.

The electrical system illustrated for controlling the solar heater and the heat pump is merely illustrative of one method that may be used and other additions and modifications thereof may be employed without departing from the scope of the invention.

The illustrated system includes a pair of supply leads 70 for supplying power for the operation of the motors 20 and 62, which in turn operate the circulating pumps 18 and 60 respectively, and for operation of the heat pump 44. The motor 20 is connected to one supply lead 70 by means of the circuit connection 72, and the other side of the motor 20 is connected through the thermostat 24 in the tank 16 by means of the leads 74 and 76 to the other side of the line 70. In this way the circulating pump 18 is operated by the thermostat 24 when a predetermined temperature differential as measured by the differential thermostatic devices 22 and 24 exists between the solar heater 10 and the tank 16. This differential can be set for any desired value so that water from the tank 16 is circulated through the solar heater only when the temperature of the heater is above that of the tank by a predetermined amount.

The heat pump 44 is connected to the supply lines 70 by the lead 78 and a control circuit which includes lead 80, thermostat 58 on the tank 56, and the lead 82. A double pole, single throw switch 84 is inserted in order to turn off the heat pump during those seasons of the year when sufficient heat is obtainable from the solar heater without the interposition of the heat pump 44. During the winter seasons, however, operation of the heat pump is directly determined by the temperature of tank 56 through the thermostat 58.

The operation of the motor 62 associated with the circulating pump 60 for circulating hot water through the building for heating purposes is controlled by a room thermostat 86 which can be positioned in any desired location in the building. A stepdown transformer 88 having its primary 88' connected across the lines 70 and its secondary 88" connected to a relay 90 supplies the low voltage control for the motor. The motor 62 is connected to the supply lines 70 by the lead 92 and the circuit which includes lead 94, contacts of the relay 90 and the lead 96. In this way when the room thermostat 86 calls for heat it closes the low voltage circuit and energizes the coil of the relay 90. This closes the relay contacts and completes the circuit to the motor 62 for operation thereof and of the pump 60.

Figure 2:
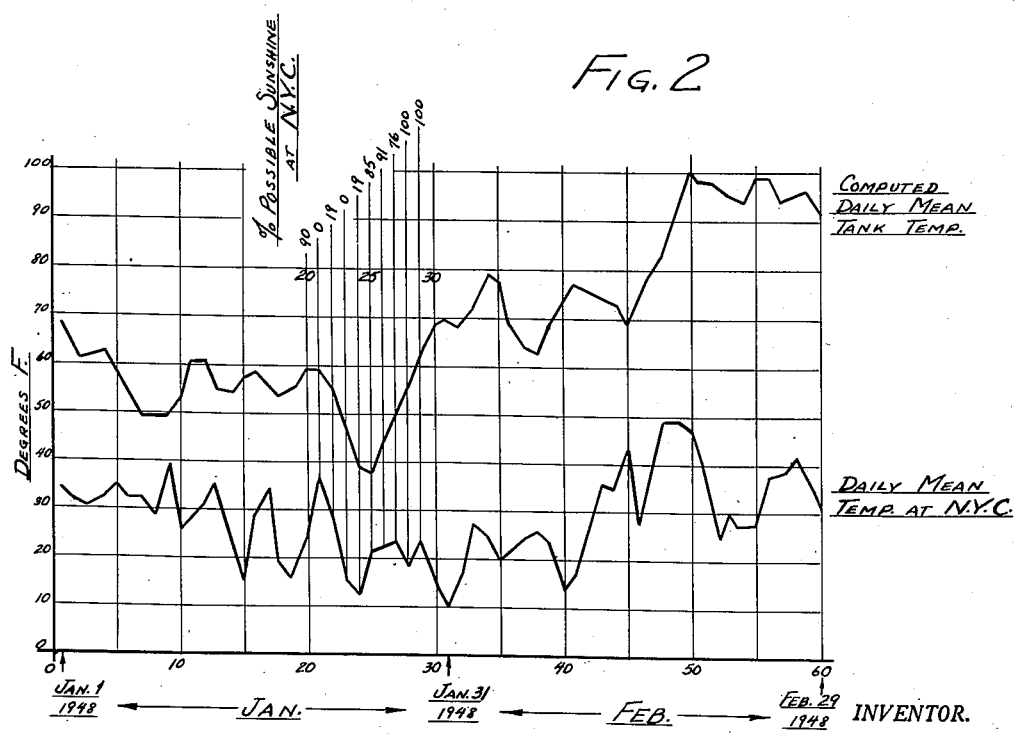
Fig. 2 is a set of curves illustrating one feature of the operating characteristics thereof.

To more clearly illustrate certain of the advantages of my new and improved system I have shown in Fig. 2 two curves, the lower one representing the daily mean temperature in New York city for a two month period starting January 1, 1948, and ending February 29, 1948, and a computed daily mean tank temperature curve based on an assumed set of heat requirements for an average dwelling and a storage tank capacity of approximately 1,000 cubic feet.

More particularly the following conditions were assumed:

Solar heater area, 1,000 sq. ft.
Volume of the storage tank 16, 1000 cu. ft.
Heat requirements in B. t. u per degree day, 15,000
Angle of the solar heater above horizontal (New York city area), 57½.

With these assumptions the day by day computations were carried out as follows:

Suppose the mean temperature for a given day at New York city is reported at 19°. This gives 65−19, or 46° days, where 65 is an assumed room temperature used for computation of fuel requirements. Thus a house requiring 15,000 B. t. u. per degree day would require 46×15,000 or 690,000 B. t. u. Assuming now that the sunshine during this particular day is such that 600,000 B. t. u. is delivered to the storage tank 16, the change in the temperature tank can then be computed. Thus if the tank at the beginning of the day was 61.1° F., the final temperature after the loss of 90,000 B. t. u. would be 61° F. or an average for the day of 61.05° F. These computations are based on the use of water as a medium for the conduction of heat from the solar heater 10 to the tank 16.

An ideal heat pump operating from 61.05°−10°, or 51.05° F. to 120° F. would have a coefficient of performance of—

$$\frac{460+120}{120-51.05}=\frac{580}{68.95}=8.41$$

and to deliver 690,000 B. t. u. of heat would require 24.0 kilowatt hours.

By carrying through computations such as this for each day of January and February 1948, I find the ideal heat pump required 603 kilowatt hours in January and 363 kilowatt hours in February, making a total of 966 kilowatt hours for the two coldest months of the heating season.

If we assume the heat pump to have an efficiency of 80% for its compressor and 80% for its driving motor, we get—

$$\frac{966}{.8\times.8}=\frac{966}{.64}=1500 \text{ kw. hrs.}$$

At two cents per kw. hr. the cost is estimated at $30.00.

Assume two ⅛ H. P. circulator pump motors 20 and 62, the one pumping to the solar heater operating one-quarter of the time, and the one pumping to the radiators operating one-half of the time, and assume 50% efficiency for each. On these assumptions, the pump motors consume 275 kw. hrs. Thus the total estimated power consumption is 1775 kw. hrs. At two cents per kw. hr. the cost totals $35.50.

For purposes of comparison, let it be assumed that the same house is heated with coal at say $16.00 per ton and that the coal is burned with an efficiency of about 65%. To supply heat for the months of January and February 1948, on which the above computations were based, the coal needed would be approximately 2.1 tons and would cost $33.60. This comparison, however, is based on only two months of the year.

As previously pointed out, however, the heat pump 44 need only be operated during the winter months and the solar heater will supply sufficient heat on the average from about the middle of March to the end of November of each year. On the basis of an over-all efficiency of 64% for my system with a temperature in the tank 56 of about 120° F. and a temperature in the tank 16 of about 10° F. less than the daily mean temperature, I have found that the total yearly cost of electrical energy at the rate of approximately two cents per kilowatt hour would amount to about $60.24. Under the same conditions, a hand-fired coal boiler operating at about 50% seasonal efficiency on coal selling for about $16.00 a ton, the total cost would be $105.60, and an oil burner fired boiler at a seasonal efficiency of about 60% using oil costing approximately eleven cents per gallon, the seasonal cost would be approximately $103.80, which does not take into account the cost of electrical energy for operating the oil burner. On the basis of the foregoing comparisons, it is apparent that my system can not only be operated at almost half the cost of a conventional system but it has the advantage of conserving natural resources. That is to say that the ratio of the heat pumped by the heat pump 44 for a given amount of electrical energy is approximately six or more times as great as that which would be attained if the same amount of electrical energy were used for obtaining heat for means of say a resistor. Since coal or other form of power is used to generate electricity, the use of that power to operate a heat pump tends to compensate for the losses resulting in the generation of the electric power. In this way natural resources are greatly conserved and the conservation of resources is of rapidly growing importance.

My new and improved system has still another advantage which may be termed "a self-regulating characteristic." When the outside temperature falls the heat losses of the solar heater increase. As a result, the net heat supplied (for a given amount of sunshine) to the storage tank 16 is reduced. At the same time, however, the lower outside temperature increases the demand for heat. Thus there is a tendency for the tank temperature to fall when the outside temperature falls, and vice versa. The falling tank temperature tends to reduce the losses from the solar heater and to increase the net heat supplied to the tank for a given amount of sunshine. Thus it is apparent that the system will adjust itself to the temperature of the tank 16 with respect to the outside temperature so that the solar heater may work efficiently at all times.

The correlation between the temperature of tank 16 and the outside temperature is not apparent over a short period of a day or so, but it is evident over longer periods of a week or more. This trend is clearly indicated by a comparison between the upper and lower curves of Fig. 2.

To further illustrate the importance of my invention, I have shown in Fig. 2 the percentage of possible sunshine available in the New York city area from January 20th to January 30th, a period of coldest weather experienced in the two months. It will be noted that on January 21st no sunshine was obtained at all. On the 22nd approximately 19% of sunshine was available. On January 23rd no sunshine was available. On Jan. 24th approximately 19% of the sunshine was available. During those four days the temperature of the tank dropped from about 59° down to approximately 37°, and the outside temperature ranged from approximately 36° to 13°. Thus during a period of four days when little or no sunshine was available the temperature of tank 16 dropped only about 20°.

This invention in addition to enabling the reduction in size of the solar heater and the storage tank associated therewith also permits a material reduction in size of the heat pump or heat transfer means because the solar heater provides on the average a higher temperature source than would commonly used sources such as underground streams, wells, earth and the like.

To illustrate this advantage, on January 31, 1948, which was the coldest day indicated on the graph in Fig. 2, an ideal pump would consume about 25.3 kilowatt hours to deliver 825,000 B. t. u. The mean tank temperature on this day was just under 70° F. In contrast, on January 24, 1948, an ideal heat pump would consume 36 kilowatt hours to deliver 780,000 B. t. u. with a mean tank temperature of 38.7° F. The mean tank temperature for the two months shown on the graph was about 70° while the temperature of a good earth source is about 40° F. and an underground stream is only about 55°. It is therefore evident that with the high average tank temperature obtained with my system as compared with these sources, the power required to deliver a given amount of heat is materially reduced and, therefore, a smaller capacity heat pump than would otherwise be required could be used.

With my system I am able to further reduce the size of the storage tank associated with the solar heater under conditions where it would be economical when using water as the heat transfer medium to replace the water in the tank with warmer city supplied water in order to raise the temperature thereof. The propriety of this action would of course depend on the relative cost of water versus the cost of electrical energy in the particular location and on the saving in initial cost of the equipment and the space conserved by the use of a smaller tank.

Although not illustrated in Fig. 1, it may be desirable to include a relay between the heat pump 44 and the thermostat 58 to control the power to the heat pump. This would be especially desirable in installations employing high capacity pumps.

Another advantage of my new and improved system, therefore, is the elimination of the conventional chimney and attendant smoke and soot are completely avoided and heat is insured during periods of fuel shortages as long as electrical energy is available. Moreover, the size of the components such as the solar heater, the storage tanks and the heat pump, can be very much smaller than when using either the solar heater or the heat pump alone, and I have found a self-regulating characteristic to exist to improve the operation of the solar heater over and above that for the heater when used without the heat pump.

The computations set forth herein for the maintenance of the temperature of the tank 56 at approximately 120° is based on the use of a panel heat type of system wherein the heating or radiating pipes are embedded in the walls, floor and ceiling of each room. It is apparent, however, that this ssytem would be equally applicable to other types of heating systems as well as for hot air systems while realizing the advantages of this combination.

I have also found that by reason of a relatively constant source of heat for the heat pump more efficient and improved operation can be obtained.

I claim:

1. The method of operating a solar heater comprising circulating a fluid medium in a fluid reservoir through the solar heater, transferring heat from the reservoir to a vaporizable medium, compressing said medium and discharging the heat of compression to a third medium and controlling the transfer of heat from the fluid medium to said vaporizable medium to maintain the temperature of the fluid medium below a temperature of 70° F. above the atmosphere surrounding the solar heater.

2. A heating system comprising a solar heater, a fluid reservoir including means for circulating the fluid in the reservoir through the solar heater to raise the temperature of the fluid in the reservoir, a heat transfer means in said reservoir, a second fluid reservoir including a second heat transfer means therein, a heat pump connected with each of said transfer means to remove heat from the first said reservoir and discharge in said second reservoir at an increased temperature, and control means for maintaining the temperature of said first reservoir below a temperature of 70° F. above the ambient temperature of the solar heater.

3. A heating system for buildings having conduits for the circulation of heated fluid comprising a solar heater having a plurality of conduits mounted on a plate and covered by transparent glass, said heater being exposed to the sun's rays for the absorption of heat therefrom, an insulated fluid storage tank communicating with said solar heater conduits, a circulating pump including thermostatic controls electrically connected therewith and responsive to the temperature of said solar heater and the fluid in the storage tank to circulate the fluid from the storage tank through said conduits when the temperature of the conduits is greater than the tank temperature, a heat pump including a compressor and driving means therefor, a second fluid storage tank of smaller capacity than the first said tank, said heat pump receiving heat from the first tank and delivering heat to the second tank, thereby raising the temperature of the fluid in the second tank above that of the fluid in the first tank, means connecting said building conduits with said second tank for circulating fluid in the second tank through the building conduits, and means including a heat exchange unit in the first tank and a valve connecting the building circulating system with the last said heat exchange unit whereby the fluid circulated through the building can be directed through the last said heat exchange unit to bypass the second tank and the heat pump.

4. A heating system according to claim 3 wherein the circulating system for heating the building is of the radiant heating type.

5. A heating system comprising a solar heater having conduits therein, a fluid storage tank connected with the conduits in the solar heater, means for controlling the circulation of fluid through the solar heater, a heat pump including a first heat exchange device in said storage tank and a second heat exchange device in the heating system, said pump transferring heat from the storage tank to the heating ssytem, and thermal responsive means responsive to the temperature at which heat is delivered to the heating system and to the temperature of the solar heater and storage tank to operate the circulating means and heat pump to maintain the temperature of the solar heater and storage tank below that of the heat delivered to the heating system.

6. In a heating system of the character set forth, the combination of a solar heater, a heat storage reservoir containing fluid heated by the solar heater, a heat exchanger in said reservoir, a second reservoir, a heat exchanger in said second reservoir and a heat pump in communication with said heat exchangers including a compressor for circulating a fluid through said heat exchangers for transferring heat from the first reservoir into the second reservoir at a higher temperature and thermostatic control means responsive to the temperature difference between the solar heater and the heat storage reservoir to circulate fluid in the storage reservoir through the solar heater when the latter is at a temperature above temperature of the fluid in the storage reservoir.

LEON T. WILSON.

REFERENCES CITED

The following references are of record in the file of this patent:

UNITED STATES PATENTS

| Number | Name | Date |
| --- | --- | --- |
| 659,450 | McHenry | Oct. 9, 1900 |
| 784,005 | Ketchum | Feb. 28, 1905 |
| 1,765,136 | Drane | June 17, 1930 |
| 1,969,187 | Schutt | Aug. 7, 1934 |
| 1,980,688 | Lewis | Nov. 13, 1934 |
| 2,242,588 | McGrath | May 20, 1941 |
| 2,342,211 | Newton | Feb. 22, 1944 |
| 2,396,338 | Newton | Mar. 12, 1946 |
| 2,428,876 | Hawkins | Oct. 14, 1947 |